(12) United States Patent
Carley

(10) Patent No.: US 6,819,520 B2
(45) Date of Patent: Nov. 16, 2004

(54) USE OF MOMENTUM TRANSFER ACTUATORS FOR MOTION CONTROL OF FLEXIBLE MECHANICAL STRUCTURES

(75) Inventor: L. Richard Carley, Sewickley, PA (US)

(73) Assignee: IC Mechanics, Inc., Pittsburgh, PA (US)

( * ) Notice: Subject to any disclaimer, the term of this patent is extended or adjusted under 35 U.S.C. 154(b) by 350 days.

(21) Appl. No.: 09/747,140

(22) Filed: Dec. 22, 2000

(65) Prior Publication Data

US 2002/0080517 A1 Jun. 27, 2002

(51) Int. Cl.[7] .......................... G11B 5/596; G11B 21/02
(52) U.S. Cl. .................... 360/77.03; 360/75; 360/77.07
(58) Field of Search ............................... 360/75, 77.02, 360/77.01, 77.03, 77.07, 290, 294, 294.1, 294.2, 294.7

(56) References Cited

U.S. PATENT DOCUMENTS

| | | |
|---|---|---|
| 4,483,425 A | 11/1984 | Newman |
| 4,525,659 A | 6/1985 | Imahashi et al. |
| 4,929,874 A | 5/1990 | Mizuno et al. |
| 5,156,370 A | 10/1992 | Silcox et al. |
| 5,327,061 A | 7/1994 | Gullapalli |
| 5,719,720 A * | 2/1998 | Lee .............................. 360/71 |
| 5,750,897 A | 5/1998 | Kato |
| 6,088,194 A * | 7/2000 | Imaino et al. ........... 360/294.3 |
| 6,268,983 B1 * | 7/2001 | Imada et al. ............. 360/294.3 |
| 6,507,463 B1 * | 1/2003 | Boutaghou ............... 360/294.3 |

FOREIGN PATENT DOCUMENTS

EP    0 852 337 A1    7/1998

* cited by examiner

*Primary Examiner*—David Hudspeth
*Assistant Examiner*—Jason Olson
(74) *Attorney, Agent, or Firm*—McDermott Will & Emery LLP

(57) ABSTRACT

This invention discloses a method for controlling the position of flexible portions of a mechanical structure by attaching one or more Momentum Transfer Actuators on the flexible portions of the mechanical structure near the points whose position is to be controlled, sensing the position of the flexible portions of the mechanical structure, and, employing one or more feedback loops, to control the Momentum Transfer Actuators to cause the flexible ends of the mechanical structure to follow a desired position as a function of time. The invention also addresses the use of combined actuating and sensing devices that incorporate both a Momentum Transfer Actuator and an inertial sensor to provide acceleration, velocity, and position information to the feedback control system.

25 Claims, 5 Drawing Sheets

USE OF MOMENTUM TRANSFER ACTUATORS FOR MOTION CONTROL OF FLEXIBLE MECHANICAL STRUCTURES

FIELD OF THE INVENTION

This invention related to momentum transfer actuators (MTAs), and, in particular, to the use of momentum transfer actuators to control the motion of a flexible mechanical structure.

BACKGROUND OF THE INVENTION

It is well known in the art to actively damp the vibrations caused by a machine so as to prevent the coupling thereof to the surrounding environment. It is also well known in the art to actively damp unknown vibrations from the environment so that they do not disturb a motion sensitive piece of equipment, such as a camera or photolithography machine.

Typically, the application of inertial force within a support member, under control of a feedback system, is used to cancel out the force applied to the vibrating side of the support member to achieve vibration isolation between the vibrating side of the support member and the "quiet" side of the support member. The feedback system senses forces applied to the member and cancels the forces by the application of equal and opposite forces. This concept is the basis for a wide variety of active vibration damping schemes, such as those disclosed in U.S. Pat. No. 4,483,425 (Newman), U.S. Pat. No. 4,525,659 (Imahashi, et al.), U.S. Pat. No. 4,929,874 (Mizuno, et al.), U.S. Pat. No. 5,156,370 (Silcox, et al.), U.S. Pat. No. 5,327,061 (Gullapalli) and U.S. Pat. No. 5,750,897 (Kato). These prior art inventions all make use of an additional movable mass that is accelerated in such a way as to cancel out the inertial forces that would otherwise be coupled into a base plate through a coupling member. Examples of both linear motion and rotational motion of these inertial proof masses are disclosed in the prior art.

In many cases improved vibration damping of a mechanical structure is achieved by simply adding more material to increase the stiffness of the structure. In such a case, a given disturbance force will result in a smaller motion at the flexible end of the mechanical structure. However, there are a many economically important applications in which other design constraints limit the degree to which increased material can be added to the system. For example, the mechanical beams used to construct a space station must be extremely light because they have to be lifted into space from Earth's gravity well. When the mass or volume of the mechanical system is constrained, the flexibility of mechanical components can often limit the performance of the overall system.

In a typical hard disk drive there is a mechanical arm that holds the read/write head at a precise radial position over a desired track of data (see FIG. 1). This arm is attached by a rotary bearing at a point just outside the outer circumference of the disk. A voice coil actuator is attached to an extension of this arm on the opposite side of the bearing as the read/write head. Force from the voice coil actuator moves the back end of the arm, thereby causing the arm to pivot (see FIG. 2). The maximum force that can be generated by the voice coil actuator is limited. Therefore, to achieve a required arm seek time, the rotational moment of inertia of the arm, and similarly its total mass, must be limited. For example, note the holes intentionally cut into the arm example shown in FIG. 3 to reduce its mass. Because only a limited amount of material (mass) can be used in the manufacture of the arm, the arm exhibits an undesired degree of flexibility, and cannot be made arbitrarily stiffer by simply adding more material.

There are three main disturbances in a hard disk drive that affect the position of the read/write head relative to the desired data track on the disk—actuator bearing hysteresis, windage disturbance, and non-repeatable disk bearing noise (a.k.a. non-repeatable runout). Actuator bearing hysteresis is a time-dependent nonlinear behavior typical of mechanical bearings. It typically results in an initial delay in motion resulting from a force applied to the voice coil actuator followed by some overshoot in the desired motion. The windage disturbance is a non-predictable turbulence force that is applied to the head. Non-repeatable bearing noise results in the disk itself moving slightly over time in an unpredictable way. Note this unpredictable disk motion results in a relative position error of the head since it must be over a specific track on the disk for read or write operations to be successfully executed.

Because of the above disturbances, the read/write head may not always be able to be positioned over the precise spot on the magnetic disk surface that is required for a successful read or write. Therefore, it is desirable that the portion of the arm to which the read/write head is attached be able to be positioned over the correct spot on the disk despite the disruptive forces described above. In general, it is desirable that a flexible mechanical structure, such as the arm of a hard disk drive, be made to follow a precise mechanical position or track a precise mechanical path (e.g., track out the non-repeatable runout of the disk) as a function of time, in the presence of disruptive external forces (e.g., the vibration or high frequency oscillation caused by windage forces).

SUMMARY OF THE INVENTION

This invention, like the prior art described above, makes use of inertial force as generated by an (MTA) to affect the motion of a flexible support member. However, the current invention addresses a very different application for this same basic device. Instead of attenuating or blocking the transmission of a force or torque through a flexible structural member, the focus of this invention is the use of feedback controlled inertial force, added to the existing force transmitted in the flexible structural member, to precisely control the position of a specific part of a flexible mechanical structure as a function of time. This invention applies to the general case in which it is desired that the position of some part of a flexible mechanical structure follow a precise function of time, and one or more MTAs are used to both cancel disturbance forces and to position the flexible mechanical structure to follow a desired trajectory.

Specifically, the invention related to the head of a hard disk drive, which is typically mounted at the end of a flexible mechanical structure. In a typical hard disk drive, the position of the read/write head relative the desired data track is determined periodically whenever the read/write head passes over sector servo marks which are embedded between data tracks. A typical servo burst rate in today's hard disk drives is on the order of 10 KHz. For feedback loops operating at high frequencies, the phase delay caused by this periodic sampling of the position error signal may result in poor stability. Although this could be remedied by simply using more frequent servo bursts, doing so would take away surface area that could be used to store data. Therefore, is preferred to make use of an inertial sensor to augment the sampled data position signal available from the servo bursts. One possible use of this system would be to interpolate between samples using the inertial sensor.

Another aspect of this invention is the use of an inertial sensor combined with an MTA to provide acceleration, velocity, and position information concerning the location of the mechanical structure to which the MTA is attached. This information is used in addition to other acceleration, velocity, or position signals in order to improve the performance of the overall feedback system.

DETAILED DESCRIPTION OF THE INVENTION

Figure 3:
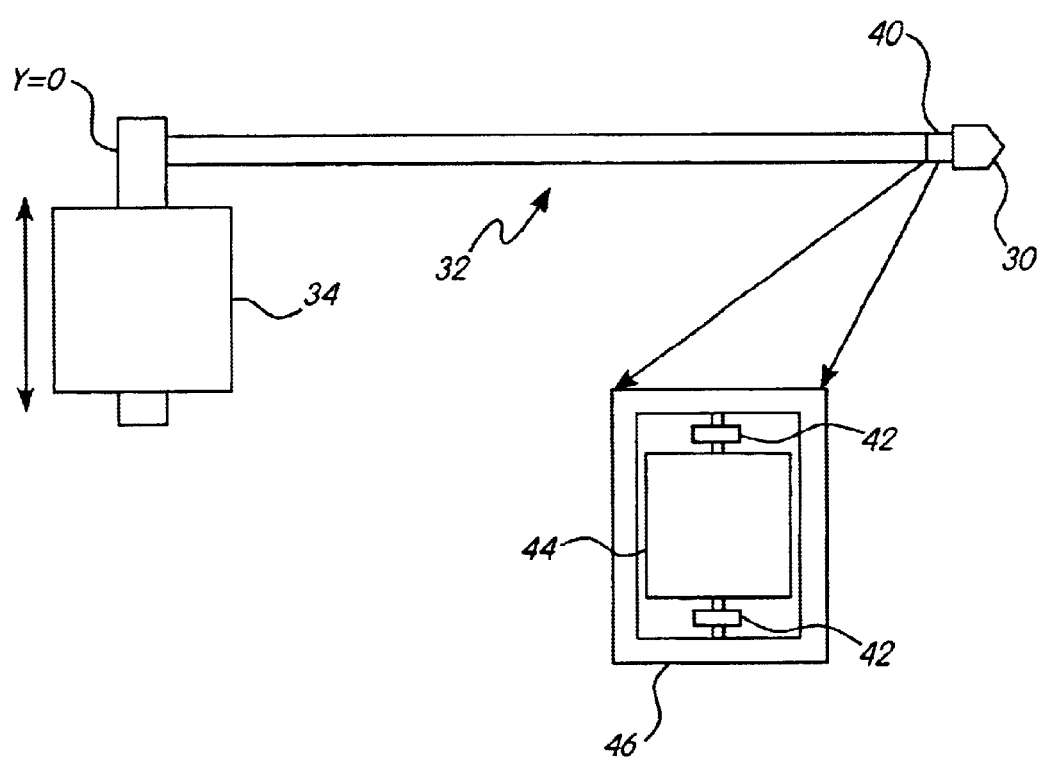
FIG. 3 is a schematic diagram showing the components of the flexible arm and the MTA.
Figure 4:
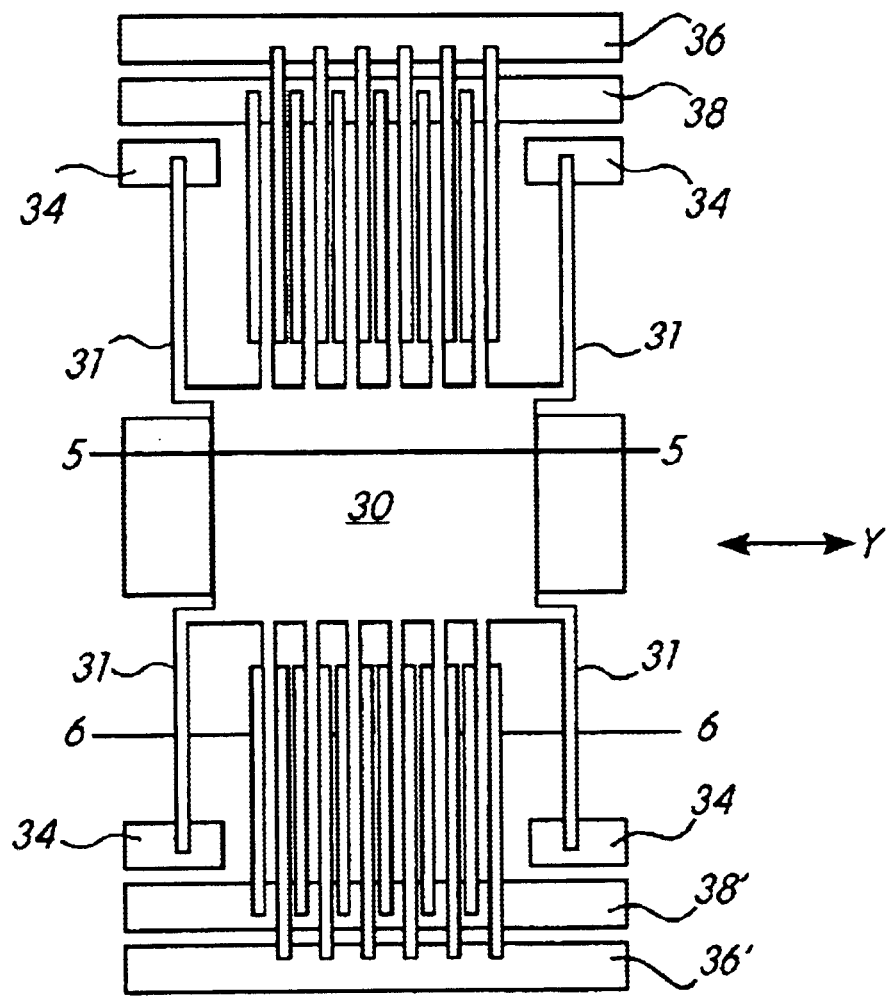
FIG. 4 is the top view of an MTA MEMS device
Figure 5:
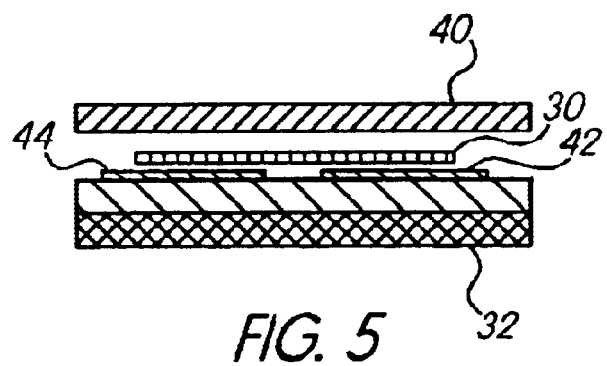
FIG. 5 is a cross sectional view of a portion of the MTA MEMS device of FIG. 4.
Figure 6:
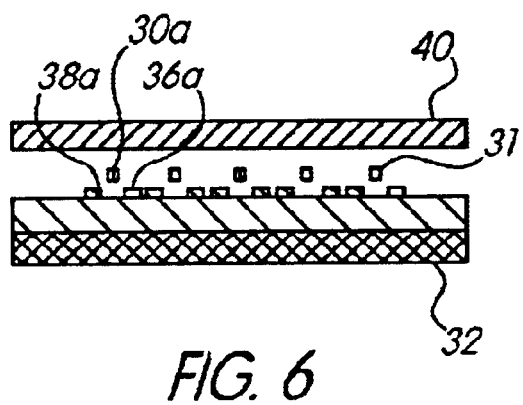
FIG. 6 is a cross sectional view of a second portion of the MTA MEMS device of FIG. 4.

The preferred embodiment of the invention is shown schematically in FIG. 3. Preferably MTA 50 is a MEMS device construed on a silicon substrate. The internal parts of MTA 50 are shown schematically in FIG. 3 and include proof mass 20, Y access actuators and suspension components 42 and encapsulation 46. The actuator may be constructed according to methods disclosed in our co-pending U.S. patent application Ser. No. 09/659,961 entitled "Thin Film MEMS Sensors Employing Electrical Sensing and Force Feed Back". One possible implementation of such a device is shown in FIGS. 4–7. FIG. 4 shows a top view of the device. It can be seen that proof mass 20, which is suspended by arms 31 can easily move in the Y direction. Motion in the X direction is inhibited because of the stiffness in the X direction of arms 31. Further, motion in the Z axis is inhibited by a virtue of electrodes 40 and 32 which might be placed above and beneath proof mass 20. FIG. 6 shows a cross-section of the device of FIG. 4. It can be seen that fingers 30a can be made to move in the Y direction through the use of electrostatic force induced by a voltage difference between fingers 30a and either electrodes 36a or electrodes 38a depending upon the desired direction of movement of proof mass 20. This is shown schematically in FIG. 7 (note that only one set of electrodes and one finger is numbered in FIG. 7, but there are, in actuality, a plurality of each). Through the application of voltage differences between electrode 38a and finger 30a or electrode 36a and finger 30a, proof mass 20 can be made to move in the Y direction while remaining virtually motionless in the X and Z directions. Also in the preferred embodiment, MTA 50 is encapsulated on the surface of a silicon substrate. This can be accomplished by manufacturing the device according to the method disclosed in our co-pending U.S. patent application Ser. No. 09/583,386 entitled "Manufacture of MEMS Structures in Sealed Cavities using Dry-Release MEMS Device Encapsulation." This is desirable because the electrostatic forces applied between electrodes 36a, 38a and fingers 30a of proof mass 20 would tend to attract dirt particles which could eventually foul and inhibit the operation of the device.

Although MTA 50 is shown as a micro-encapsulated MEMS structure, it is also possible to use a macro structure. The advantage of having MTA 50 constructed as a MEMS device is its low total mass.

Figure 1:
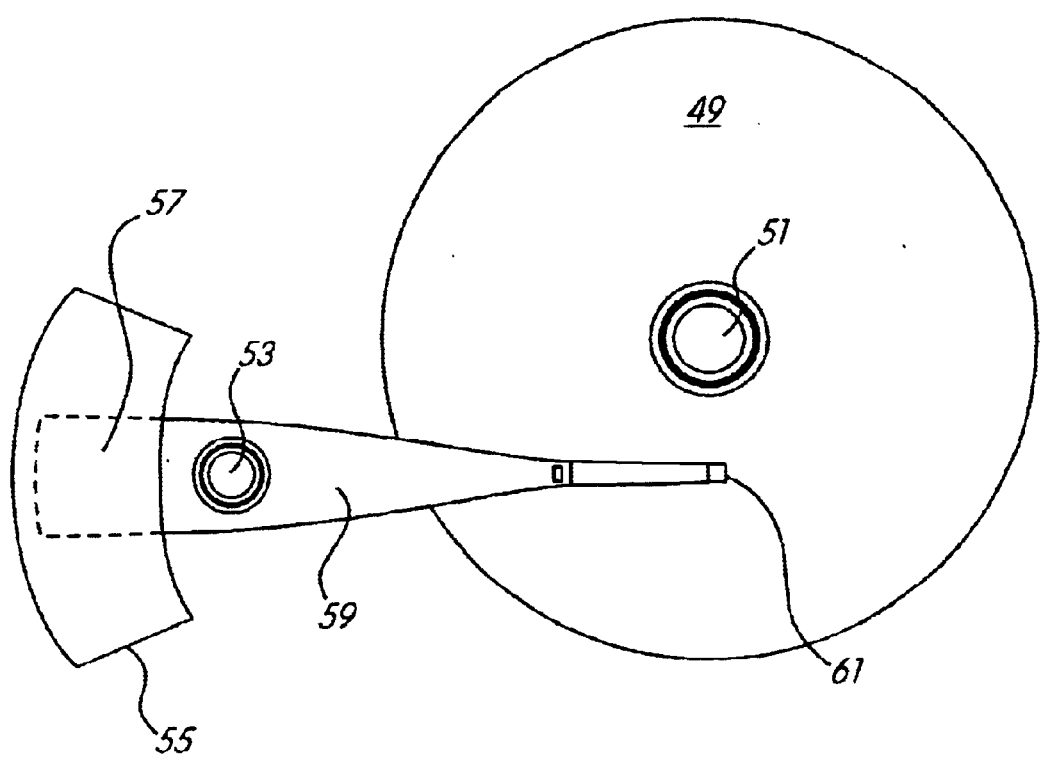
FIG. 1 is a top view of a the components of a typical disk drive.
Figure 2:
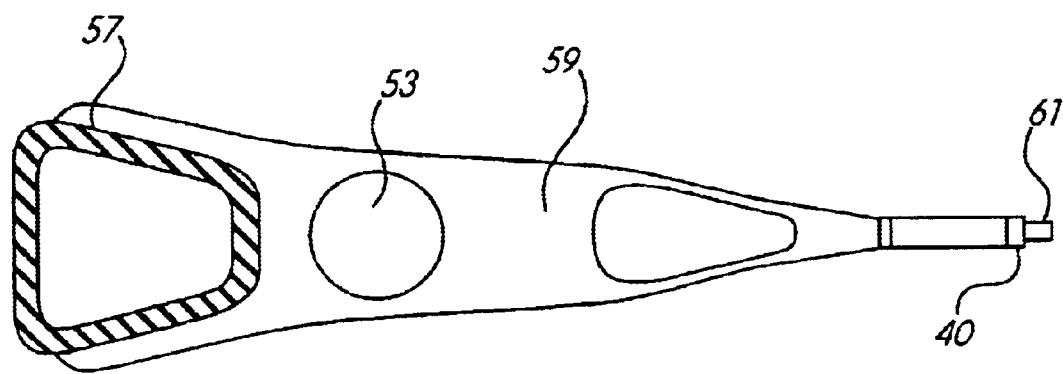
FIG. 2 is a top view of the arm showing the details thereof and the position of the MTA with respect to the read/write head.

The preferred embodiment of the invention is described in the context of a two stage positioning system of a hard disk drive arm, as shown in FIG. 1. Generally, such a system is composed of an arm 59 which is free to rotate about bearing 53, read/write head 61 is located at the end of the flexible arm 59, media 49 spins on spindle 51. Flexible arm 59 rotates about bearing 53 to move read/write head 61 radially over media 49. The arm is driven by voice coil actuators composed of magnet 55 and coil 57. The arm is shown in more detail in FIG. 2. In the case of the preferred embodiment of the invention, voice coil actuator 57 acts as a low frequency actuator and MTA 50, positioned near the read/write head as shown in FIG. 2, acts as a high frequency actuator. Because arm 59 is flexible, the frequencies at which the head can be precisely controlled by the voice coil actuator are limited. For example, in a typical hard disk drive this upper limit is on the order of 1 kHz. MTA 50, attached near read/write head 61, is able to move the head at much higher frequencies, as the flexibility of the small part of the arm between where MTA 50 is mounted and where read/write head 61 is mounted can be very small. By applying high-frequency signals to the internal actuators of MTA 50, as shown in FIGS. 4–7 and schematically in FIG. 3, the fine position of read/write head 61 can be precisely controlled even at high frequencies. The feedback loop controlling the head position must separate the feedback force into low frequency components, which might be applied by voice coil 57, and high frequency components, which might be applied by MTA 50. The proper application of forces to both the voice coil and the MTA can cause read/write head 61 to follow a precise track over the surface of disk 49.

FIG. 3 shows MTA 50 attached to flexible beam 35 very near to point 30. Point 30 is the point on the flexible head whose precise path over disk 49 needs to be controlled. Note that MTA 50 need not be attached exactly at the point shown in FIG. 4. In general, the positioning accuracy will improve as MTA 50 is attached to mechanical parts of the structure that are more rigidly connected to point 30 whose precise positioning is desired. It is also possible to use multiple MTAs to control multiple flexible parts of more complex mechanical structures. In an alternative embodiment of the invention, it is possible to use one or more macroscopic actuators attached to one or more parts of the mechanical structures and one or more MTAs attached to one or more flexible portions of the structure.

In yet another embodiment of the invention, it is possible to use an inertial motion sensor to measure acceleration velocity and position to provide information on the position of the flexible end of the mechanical structure to the overall feed back control algorithm. It is contemplated that the inertial sensor also be a MEMS device constructed according to the methods disclosed in our co-pending patents previously cited. It is also contemplated that the MTA and the inertial sensor be integrated on the same substrate and/or constructed into separate or a common sealed enclosure utilizing the encapsulation manufacturing technique disclosed in our co-pending patent application.

With respect to the feedback control algorithm, it is possible to operate with a combination of inputs, including inputs from any inertial sensors which are utilized or position inputs derived from the reading of sector server bursts which are written onto the surface of media 49. Sector server bursts can give precise position information to the feedback control system as to the positioning of read/write head 61 relative to the desired track of data on the surface of media 49.

Figure 7:
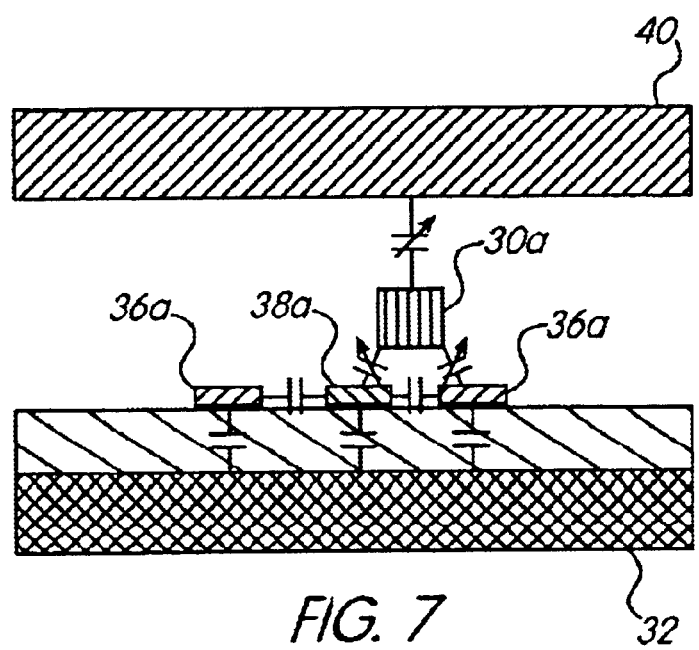
FIG. 7 is a schematic representation of the device of FIG. 4.

The present invention has been disclosed in terms of the use of the method to counteract vibrations or other mechanically induced movements of the flexible arm of the hard disk drive, and to cause the read/write head to follow a precise path around the disk. However, it is contemplated that the method could be used with any flexible mechanical structure to make the structure follow a precise mechanical path. In the case of the hard disk drive, this precise mechanical path is the one determined by non-repeatable motion of the disk. Therefore, the invention is not meant to be limited to the use of the method in a hard disk drive. Further, the invention is not meant to be limited to the precise construction of the MTA or inertial sensor. The MTA and inertial sensor may be of many different constructions. The motion of the proof mass maybe rotational or linear and the MTA itself may be a macro structure and not a MEMS device. Further, when the MTA is a MEMS device there are a plethora of possible designs from which to choose. The design shown in FIGS. 5–7 are only one example of a possible design for the device. Therefore, the scope of the invention is not meant to be limited by the examples used herein but is encompassed by the scope of the following claims.

I claim:

1. A method of controlling the position of a point on a flexible mechanical structure comprising the steps of:
   providing one or more momentum transfer actuators for generating an inertial force;
   mechanically coupling said momentum transfer actuators to said point on said flexible mechanical structure, so that said momentum transfer actuators can apply said inertial force to said point to impart momentum to said point; and
   using said momentum transfer actuators to move said point such that said point follows a desired path over time.

2. The method of claim 1 further comprising the steps of: receiving feedback regarding changes in said position of said point due to outside forces; and using said momentum transfer actuators to counteract said outside forces such that said point follows said desired path.

3. The method of claim 1 further comprising the steps of: receiving feedback regarding changes in said desired path; and using said momentum transfer actuators to move said point to accommodate said changes in said desired path.

4. The method of claim 2 wherein said momentum transfer actuators are micro-electromechanical devices.

5. The method of claim 4 wherein said momentum transfer actuators are encapsulated in a sealed cavity.

6. The method of claim 2 wherein said changes in said position of said point are changes relative to another body.

7. The method of claim 6 wherein said flexible mechanical structure is the arm of a hard disk drive and further wherein said other body is a hard disk media.

8. The method of claim 5 further comprising the step of providing one or more inertial sensors to provide said feedback regarding said changes in said position of said point due to outside forces.

9. The method of claim 8 wherein said inertial sensors are micro-electro mechanical devices.

10. The method of claim 9 wherein one or more of said inertial sensors and one or more of said momentum transfer actuators have been manufactured on a common silicon substrate.

11. The method of claim 9 wherein said inertial sensors have been encapsulated in a sealed cavity.

12. The method of claim 11 wherein one or more of said inertial sensor and one or more of said momentum transfer actuators have been encapsulated in a common sealed cavity.

13. The method of claim 2 further comprising the steps of: separating said outside forces into high and low frequency components; using said momentum transfer actuators to counteract said high frequency components of said outside forces; and providing one or more additional actuators to counteract low frequency components of said outside forces.

14. For a hard disk drive having a media, an arm having a read/write head positioned on one end thereof and a radial actuator for moving the arm substantially radially along said media, a positioning system for said read/write head comprising:
   one or more momentum transfer actuators for generating an inertial force, said momentum transfer actuators being coupled to said arm in proximity to said read/write head; and
   a feedback control circuit for said momentum transfer actuators,
   wherein said feedback control circuit causes momentum from said inertial force to be transferred from said momentum transfer actuators to said arm such that said read/write head follows a desired path along said media as said media rotates under said read/write head.

15. The system of claim 14 wherein said feedback control circuit receives positioning information from said disk drive specifying the relative radial position of said read/write head over said media.

16. The system of claim 15 wherein said positioning information is derived from sector servo marks read by said read/write head from said media.

17. The system of claim 15 wherein said momentum transfer actuators are micro-electromechanical devices.

18. The system of claim 17 wherein said momentum transfer actuators are encapsulated in a sealed cavity.

19. The system of claim 18 further comprising one or more inertial sensors, coupled to said arm in proximity to said read/write head, for providing information regarding forces applied to said read/write head which may cause it to deviate from said desired path to said feedback control circuit.

20. The system of claim 19 wherein said inertial sensors are micro-electro-mechanical device.

21. The system of claim 19 wherein one or more of said inertial sensors and one or more of said momentum transfer actuators have been manufactured on a common silicon substrate.

22. The system of claim 19 wherein one or more of said inertial sensors are encapsulated in a sealed cavity.

23. The system of claim 22 wherein one or more of said inertial sensors and one or more of said momentum transfer actuators are encapsulated in a common sealed cavity.

24. The system of claim 19 wherein said control circuit analyzes said information regarding forces applied to said read/write head and counteracts high frequency components of said forces by sending commands to one or more of said momentum transfer actuators and low frequency components by sending commands to said radial actuator.

25. The system of claim 24 wherein said outside forces are selected from a group comprising high frequency oscillations caused by windage, actuator bearing hysteresis and non-repeatable disk bearing noise.

* * * * *